(12) United States Patent
Hama

(10) Patent No.: US 7,913,119 B2
(45) Date of Patent: Mar. 22, 2011

(54) METHOD AND DEVICE FOR VERIFYING INTEGRITY OF DATA ACQUISITION PATHWAYS

(75) Inventor: Gord Hama, Ottawa (CA)

(73) Assignee: Her Majesty the Queen in right of Canada, as represented by the minister of public safety, Ottawa (CA)

( * ) Notice: Subject to any disclaimer, the term of this patent is extended or adjusted under 35 U.S.C. 154(b) by 378 days.

(21) Appl. No.: 12/055,387

(22) Filed: Mar. 26, 2008

(65) Prior Publication Data

US 2009/0112790 A1 Apr. 30, 2009

Related U.S. Application Data

(60) Provisional application No. 60/982,537, filed on Oct. 25, 2007.

(51) Int. Cl.
G06F 11/00 (2006.01)
(52) U.S. Cl. ............... 714/29; 714/43; 714/52; 703/21; 703/23; 380/22
(58) Field of Classification Search ............ 714/29, 714/52, 735, 819, 43; 703/23, 24, 20, 21; 380/22
See application file for complete search history.

(56) References Cited

U.S. PATENT DOCUMENTS

| | | | |
|---|---|---|---|
| 4,823,333 A | 4/1989 | Satoh et al. | |
| 5,128,810 A * | 7/1992 | Halford | 360/39 |
| 5,404,361 A * | 4/1995 | Casorso et al. | 714/767 |
| 5,960,460 A | 9/1999 | Marasco et al. | |
| 6,065,119 A | 5/2000 | Sandford, II et al. | |
| 6,374,266 B1 * | 4/2002 | Shnelvar | 1/1 |
| 6,832,186 B1 * | 12/2004 | Margulieux | 703/24 |
| 6,868,375 B1 * | 3/2005 | Margulieux | 703/25 |
| 7,003,702 B2 * | 2/2006 | Budd et al. | 714/52 |
| 7,181,042 B2 | 2/2007 | Tian | |
| 7,181,560 B1 | 2/2007 | Grand et al. | |
| 7,441,159 B2 * | 10/2008 | Meng et al. | 714/52 |
| 7,536,291 B1 * | 5/2009 | Vijayan Retnamma et al. | 703/21 |
| 7,565,596 B2 * | 7/2009 | Ferren et al. | 714/763 |
| 2003/0131291 A1 * | 7/2003 | Morrison et al. | 714/54 |
| 2003/0195737 A1 * | 10/2003 | Shapiro et al. | 703/24 |
| 2006/0123189 A1 * | 6/2006 | Bitner et al. | 711/111 |
| 2006/0212922 A1 * | 9/2006 | Laksono | 725/151 |
| 2008/0034268 A1 * | 2/2008 | Dodd et al. | 714/755 |

OTHER PUBLICATIONS

Crec CD and Files CD from Mares and Company, www.dmares.com/maresware/validation_tools.htm#FILESCD.
Forensic MD5 from Logicube, www.logicubeforensics.com/products/hd_duplication/md5.asp.

* cited by examiner

Primary Examiner — Yolanda L Wilson
(74) Attorney, Agent, or Firm — Marks & Clerk; Richard J. Mitchell

(57) ABSTRACT

Disclosed is a method of verifying the integrity of data acquired from a device emulating a hard disk to a host computer over a data transfer pathway. A storage medium containing known data is connected to the data transfer pathway, the storage medium capable of emulating a hard disk. The known data is transferred from the storage medium to the host computer over the data transfer pathway for storage on the host computer. A characteristic of the data stored on the host computer is compared with a corresponding characteristic of said known data to determine whether data corruption has occurred during data transfer over said data transfer pathway. The characteristic could be a hash code value, such as a Message-Digest 5 (MD5) or Secure Hash Algorithm (SHA) value.

27 Claims, 5 Drawing Sheets

METHOD AND DEVICE FOR VERIFYING INTEGRITY OF DATA ACQUISITION PATHWAYS

CROSS-REFERENCE TO RELATED APPLICATION

This application claims the benefit of U.S. Provisional Application No. 60/982,537 filed Oct. 25, 2007, incorporated by reference herein.

FIELD OF THE INVENTION

The present invention relates generally to the acquisition or copying of data for members of forensic or law enforcement agencies. More specifically the invention relates to a method and device for verifying the integrity of a data acquisition pathway for acquiring or copying of data.

BACKGROUND OF THE INVENTION

In the provision of search/seizure services to law enforcement agencies, there is often a need to provide an exact duplicate of a suspect's or victim's hard disk so that it can be analyzed in a controlled lab environment. In order to acquire data from the subject hard disk, the law enforcement or forensic agent will typically connect the subject hard disk to a law enforcement agency-owned host personal computer in order to effect the transfer of data from the hard disk to host computer. It is important to ensure that the computer used to acquire the subject hard disk data is capable of acquiring data without loss of integrity. An acquisition failure will render data unusable for investigational use. This also causes an equipment confidence problem and may surface legal and/or competency issues. The integrity of the data must be capable of withstanding a court challenge.

Past history of forensic hard disk acquisitions shows that there is a varying risk of errors occurring during the acquisition process due to a number of factors such as faulty/low quality cables/connections, equipment bandwidth limitations, and issues with the host computer components including hardware and software when operating under load in a dynamic state. These issues can easily manifest themselves as data errors and can potentially render acquired data questionable and unusable as evidence.

During the course of acquiring the data from a hard disk, a significant weak link in the data acquisition chain is the hard disk cable connecting the subject hard disk to the host equipment, electronic components and settings of the host personal computer. Hard disk ribbon cables serving as data acquisition pathways are physically delicate and are not always robust. Accordingly these can, over time, suffer from wear and tear and it is possible that undetectable errors can result during the transfer of data due to broken wires/intermittent connections. In this event, integrity of acquired data can be lost and the data considered unusable. If the integrity of data is lost, this loss may not be readily detectable unless an independent verification is conducted. Other weak links include substandard internal components such as main memory, user programmable settings and acquisition applications.

Cable testing equipment exists; however such equipment is intended for use by manufacturers and would be ineffective for forensic use as this only tests the cable from end to end. Such equipment is limited to cables and does not address integrity assessment for the total data acquisition pathway in a dynamic state.

A data integrity measurement test for acquiring hard disk data is necessary to provide a measure of confidence that computer equipment used for acquiring hard disk data (imaging) is not corrupting data. Data can be easily corrupted if any link in the data acquisition pathway is defective.

As hard disk acquisition is typically a long process (depending on technology and size), acquisition success/failure can be determined (with greater assurance) by an independent hash measurement following initial acquisition. The hash value of the subsequent measurement is compared to the hash value of the initial acquisition. Unfortunately, the extra time required for independent verification is not always available due to operational constraints.

Using current technology, forensic agents sometimes perform an acquisition check periodically to ensure proper operation of equipment. It is generally recommended that equipment serviceability be verified prior to use; however, there are time and environmental issues that may limit the effectiveness. For example, if an equipment check is performed prior to arriving at a search site, there are still risks involved as cables must be physically handled during transportation, equipment setup and connection to each hard disk. Also, when on site, this process is repeated for each hard disk acquired. Verifying an acquisition on site (prior to departure) imposes an additional time penalty as the verification must be done using independent method/equipment which effectively doubles the processing time per hard disk.

The current practice is to acquire data using data acquisition software, such as Encase™ or similar proprietary acquisition tools, and have the software tool perform a verification of received data versus data stored on the evidence file stored on the host computer. The problem here is that if the initially acquired data is inaccurate, this verification effectively compares corrupt data to itself. A higher level of confidence would be gained by independently verifying the hash value. However, this incurs a time penalty as well as requiring another verification tool.

To mitigate these problems, forensic agents are typically instructed to verify the serviceability of equipment prior to use. This consists of a time consuming procedure of acquiring a reference hard disk and verifying that the acquired data hash matches that of the known content of the reference hard disk. The current practice may not adequately mitigate the risk of the cable developing a fault when multiple onsite imaging is performed as, the cable will always be subjected to wear and tear each time it is used. In the absence of a solution, verifying the quality of an acquisition is more difficult and time consuming to perform, possibly being ignored in field use situations, introducing risk to an investigation.

SUMMARY OF THE INVENTION

Disclosed is a method of verifying the integrity of data acquisition pathways used for acquiring data, using a storage medium with known content which can be verified by the host computer. Data integrity errors will result in a difference in a characteristic of the acquired data versus the known characteristic values. In other embodiments, the invention could be used in a research role in a laboratory, where hardware and software can be validated for use in hard disk acquisition evaluations.

Embodiments of the invention may reduce risk of a faulty acquisition. The storage medium in accordance with teaching of this invention emulates a hard disk (for example either intelligent drive electronics (IDE) or serial advanced technology attachment (SATA) or other suitable hard disk) and is used in place of a real hard disk and is visible to the host computer as a hard disk. The acquisition application on host computer can be set to acquire or preview the device as a hard disk having a pre-established number of sectors of data content that can be acquired. The acquired data can be hashed by the acquisition application and produce a characteristic, for example a Message-Digest 5 (MD5) value, which is a unique numerical value derived from a mathematical computation of the data content and order, that can be verified against the pre-established known value. This in turn may increase confidence that the data acquisition pathway is serviceable. A test in accordance with the teachings of this invention preferably performed immediately prior to acquisition and imposes a minimal time penalty prior to acquiring data from each subject hard disk, and significantly mitigates risk and reduces time by not requiring a separate acquired data verification process using a reference hard disk.

Accordingly, in one aspect, the invention provides a method of verifying the integrity of data acquired by a host computer over a data acquisition pathway. A storage medium containing known data is connected to the data acquisition pathway, the storage medium capable of emulating a hard disk. The known data is transferred from the storage medium to the host computer over the data acquisition pathway for storage on the host computer. A characteristic of the acquired data stored on the host computer is compared with a corresponding characteristic of said known data to determine whether data corruption has occurred during data transfer over said data transfer pathway. The characteristic could be a hash code value, such as MD5 or Secure Hash Algorithm (SHA). The transfer mode used in transferring the data could be any suitable transfer mode such as UDMA transfer mode or PIO transfer mode.

In another aspect the invention provides a device for verifying the integrity of a data acquisition pathway, the device comprising a non-volatile static storage medium containing known fixed data unambiguously identifiable by a predetermined characteristic; and an interface emulating a hard disk interface for connecting to a data acquisition pathway connected to a host computer, whereby the known data can be transferred from said storage medium to the host computer over said data acquisition pathway for storage on the host computer, and the characteristic of the data stored on the host computer can be compared to a corresponding characteristic of said known data to determine whether data corruption has occurred during data transfer over said data acquisition pathway.

The non-volatile storage medium could be any suitable medium such as a read-only memory or flash memory. The device may emulate an IDE or SATA hard disk.

Embodiments of the invention could relieve the law enforcement agent from maintaining a physical reference hard disk to perform this process, as such hard disks are delicate and prone to damage and general wear and tear to sensitive electronics and precision mechanical components.

The storage medium in accordance with teachings of the invention provides capability of assisting the agent to perform a rapid real time diagnostic check of data acquisition pathways prior to acquiring data from a subject hard disk. This could result in saved time for evaluation testing of personal computers and peripheral equipment such as disk duplicators and hard disk write blockers prior to purchase.

These additional features could be used in processes used to validate computer forensic processing software and hardware functions to ensure that tools meet forensic processing requirements.

Other advantages in using a method in accordance with the teachings of this invention are rapid verification, portability, will work in conjunction with current acquisition applications, and may include a cable terminator ejector to help prevent cable damage.

Embodiments of the invention may also remove the present complexity of testing data acquisition pathway integrity by incorporating test data into a hand held plug-in device that emulates a hard disk, thus automating the process. This provides a faster, simpler approach to testing equipment, especially in field conditions.

Other aspects and advantages of embodiments of the invention will be readily apparent to those ordinarily skilled in the art upon a review of the following description.

BRIEF DESCRIPTION OF THE DRAWINGS

Embodiments of the invention will now be described in conjunction with the accompanying drawings, wherein.

This invention will now be described in detail with respect to certain specific representative embodiments thereof, the materials, apparatus and process steps being understood as examples that are intended to be illustrative only. In particular, the invention is not intended to be limited to the methods, materials, conditions, process parameters, apparatus and the like specifically recited herein.

DETAILED DESCRIPTION OF THE DISCLOSED EMBODIMENTS

Figure 1A:
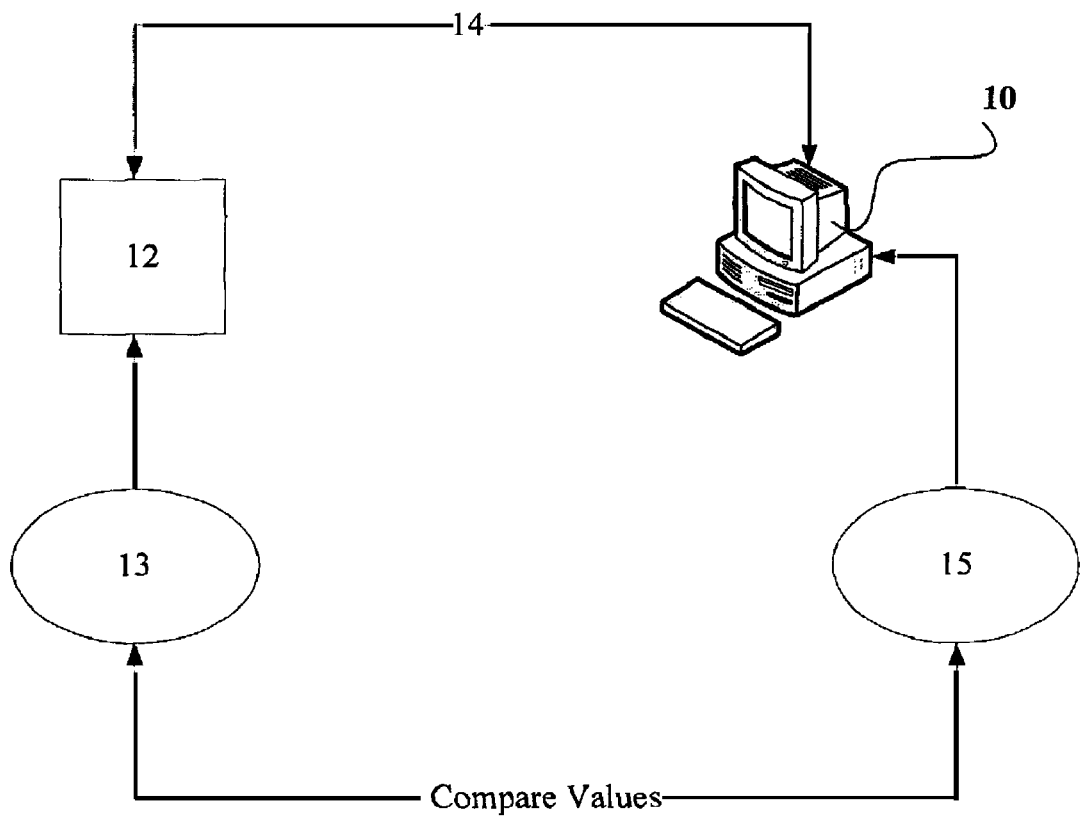
FIGS. 1a and 1b broadly illustrate portable diagnostic/test system for determining the serviceability of a data acquisition pathway between a subject hard disk and a host computer and verifying data acquisition via hard disk emulation in accordance with an embodiment of the invention.
Figure 1B:
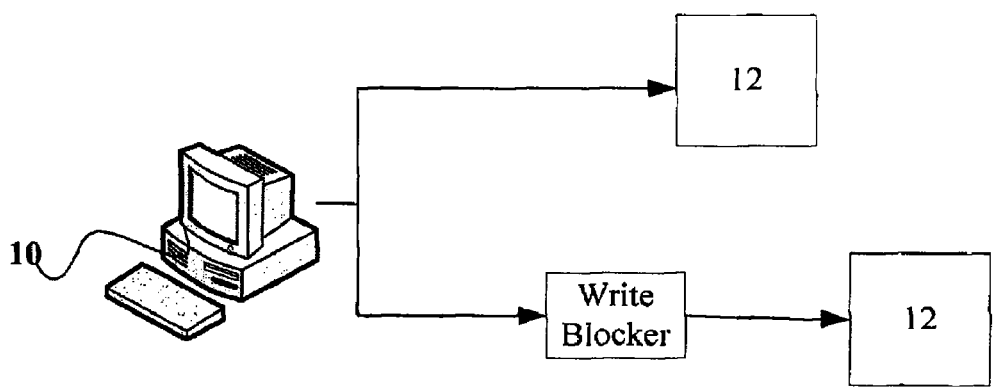

FIGS. 1a and 1b illustrate an embodiment of portable diagnostic/test system for determining the serviceability of a data acquisition pathway between a subject hard disk and a host computer and verifying data acquisition via hard disk emulation.

In FIG. 1a, host computer 10 is connected to a portable diagnostic/test device 12 over a data acquisition pathway 14, which may be in any suitable form such as a ribbon cable with a standard connector. The device 12 includes a non-volatile storage medium, such as flash card or read-only memory. The device 12 is also connected to the host computer 10 in exactly the same way as a conventional hard disk and appears to the host computer 10 as a standard hard disk. The device is platform independent and is applicable to computer systems having suitable hard disk interfaces. As can be seen by FIG. 1b, the device 12 can be in direct communication with host 10 or be connected through a write blocker. The write blocker is a peripheral device used in computer forensics to block write commands from the host PC from reaching the attached device 12.

The device is preferably capable of emulating any size of hard disk. Possible suitable load sizes are 2 Gb, 8 Gb, 20 Gb, 80 Gb, 160 Gb etc. The device could be one of a pre-set load size with pre-established hash values. However, in another embodiment the device could also permit the agent to select load size with real-time hash computations to allow for growth in sizes of hard disks. In this case, the device may comprise an embedded processing system that will allow the user to modify operational parameters, specifically for operational characteristics such as sector size, number of sectors, ATA level (standard), simulated read errors (sector address and run size), Host Protected Area (HPA) usage. Thus the emulated hard disk device 12 would have a known characteristic, such as a Message-Digest 5 (MD5) hash value which the device computes, in real time, a hash value as the device generates data and transmits it sector by sector to the host personal computer.

Figure 5:
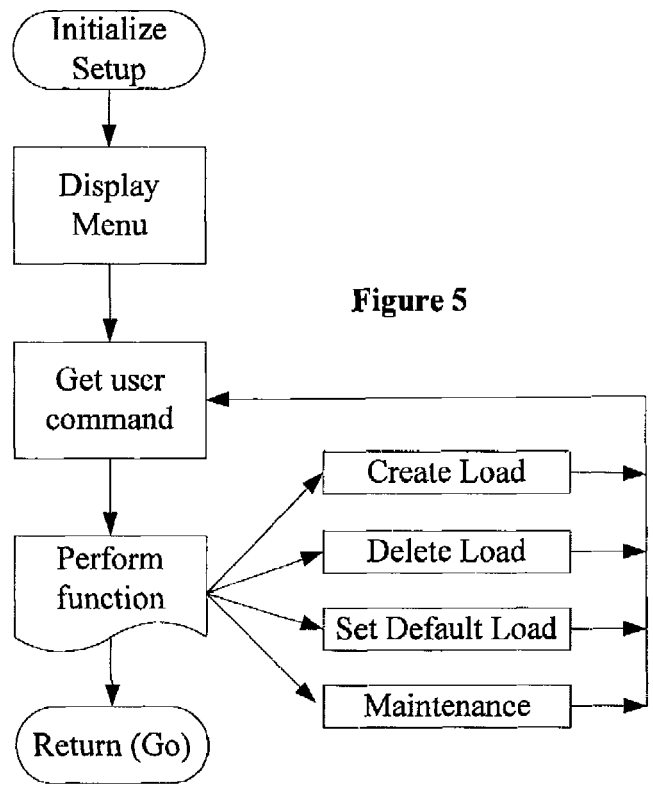
FIG. 5 is a block diagram of the algorithm for initialization and load management of the device used in FIGS. 1a and 1b.

FIG. 5 is a block diagram of the algorithm for initialization and load management of the device 12. This module initializes the device 12 and permits the user to create, delete and set default load (load management). The maintenance function permits firmware updates to be made via the USB port and a host computer.

Figure 6:
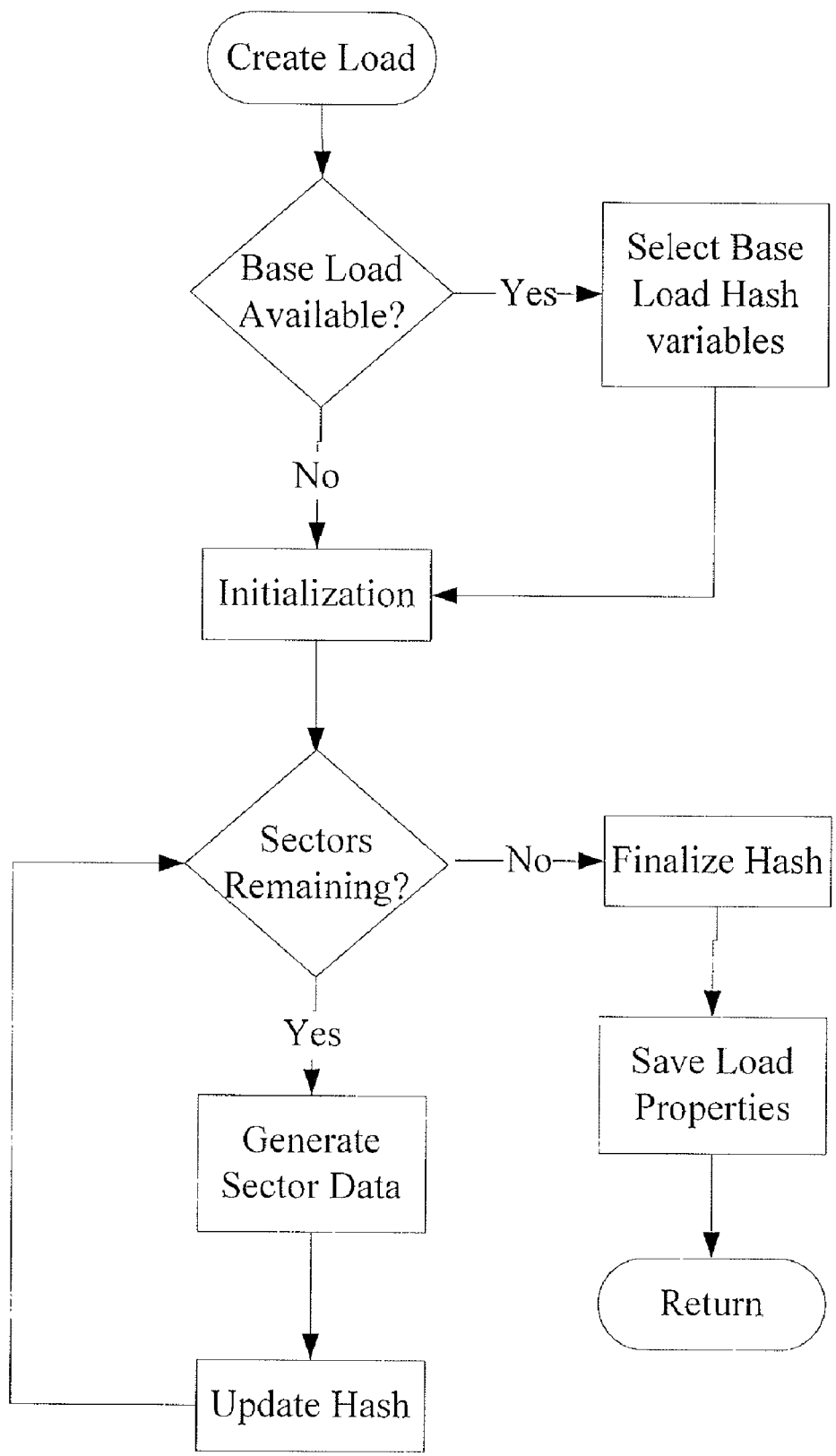
FIG. 6 is a block diagram of the algorithm to create and save a pre-determined load profile.

FIG. 6 is a block diagram of the algorithm to create and save a predetermined load profile. This module is entered from Setup to create a new test load. The use enters: ATA level emulation; load size in sections (or in MB, GB, etc.); Hash function to use (for example MD5 or SHA1); HPA information (if required, default=none); load name (text). Then the hash vector is initialized. Unique data for each sector is generated for size of load. The hash vector is updated. Then the hash vector with load properties is saved.

A combination of both pre-set values and ability for a user defined load size is also possible. The agent will be able to preset a default hard disk size, however will be able to program a different hard disk size in sectors. The rationale for different sizes of hard disk is to permit the testing to take place over both short and sustained runs.

Figure 2A:
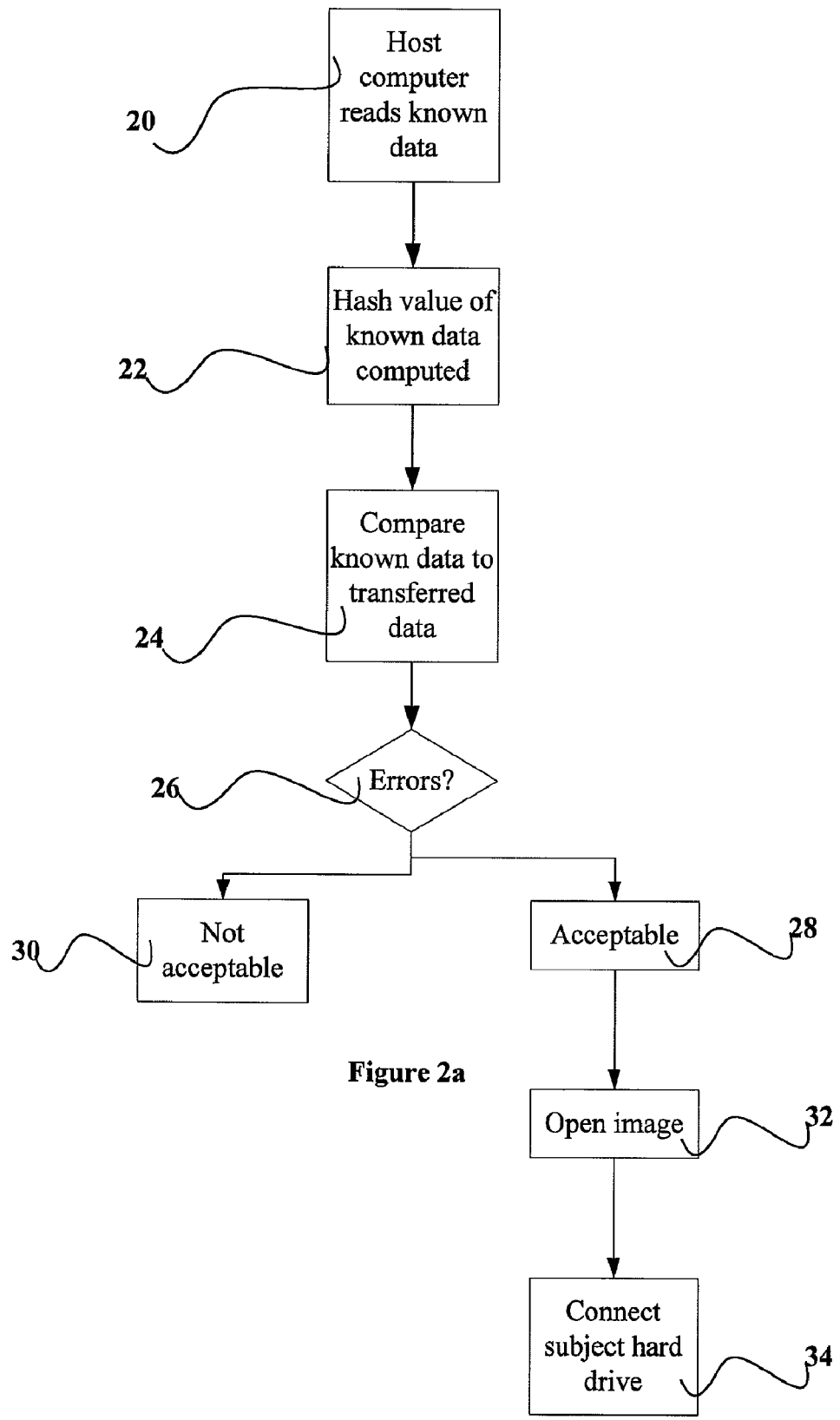
FIGS. 2a and 2b illustrate a method of using the system of FIG. 1a and 1b.
Figure 2B:
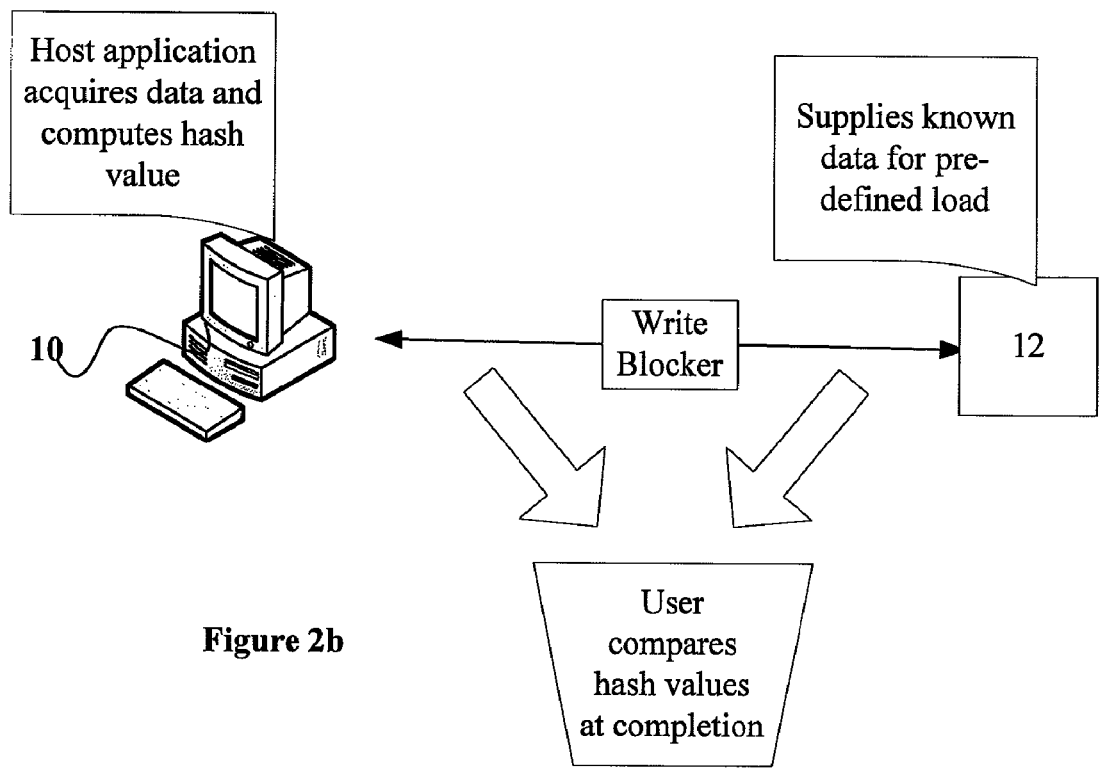

Referring to FIGS. 2a and 2b, after the user has connected the device 12 to the host computer 10 via a data acquisition pathway 14 in step 20 the host computer 10 reads the known data 13 stored on the device 12 and computes the hash value in step 22. Data transfer can be any suitable mode, such as PIO mode or DMA mode. This is then compared to the known hash value of the data 13 to that of the transferred data 15 to validate the data acquisition pathway 14 in step 24. To achieve this comparison step, the user will acquire data from the device 12 using commercially available forensic software, such as Encase™ or FTKIMAGER™ or any other equivalent application. Such applications compute the hash code of acquired data. The hash code of the load acquired from the device 12 is then visually compared to that computed by the host computer 10. The host computer 10 can be Windows/9x/ 2000/XP/Vista, Linux, MS-DOS or any other suitable system.

Figure 3:
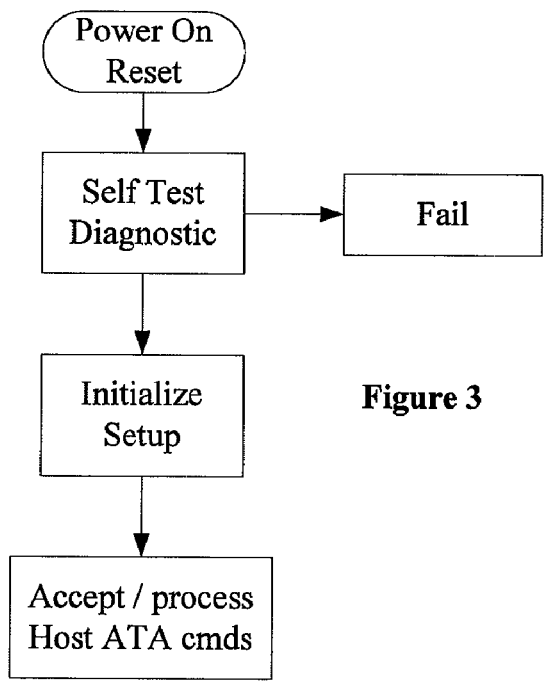
FIG. 3 illustrates the general function of the device used in FIGS. 1a and 1b.

FIG. 3 illustrates the general function of the device 12. The device is powered via an On/Off switch. At power on, the device 12 performs a self test to verify serviceability. At completion of this self test, the use must select an action to perform. The actions to select from include:
 Create: Allows user to create a hard disk profile (load).
 Delete: Deletes an existing hard disk profile (load).
 Set Def.: Select a default hard disk profile (load).
 Maint.: Maintenance mode (such as firmware upgrade). Allows console access via USB/Serial port for maintenance functions.
 Go: Device 12 sets the hard disk characteristics and become visible to host.

If the acquisition and verification hashes match and there are no read errors reported in step 26 by the forensic acquisition software used, then the data integrity was maintained with an acceptable level of certainty, indicated in step 28. Then in step 34, the subject hard disk can then be connected for data acquisition. Should read errors be reported, it can be determined that the data integrity was not maintained and that a decision has to be made by the agent to either re-image or seize the subject hard disk in step 30.

During emulation, the console displays the load characteristics and a graphical performance indicator (option to display the cumulative MD5 hash value. Load profile may be comprised of the following information:
 load name;
 device identification information (normal ATA Dev ID populated with user input);
 ATA level;
 Number of sections or MB or GB size;
 HPA information if applicable;
 Error type, start section, count (up to 16 entries);
 MD5 hash value for load.

Figure 4:
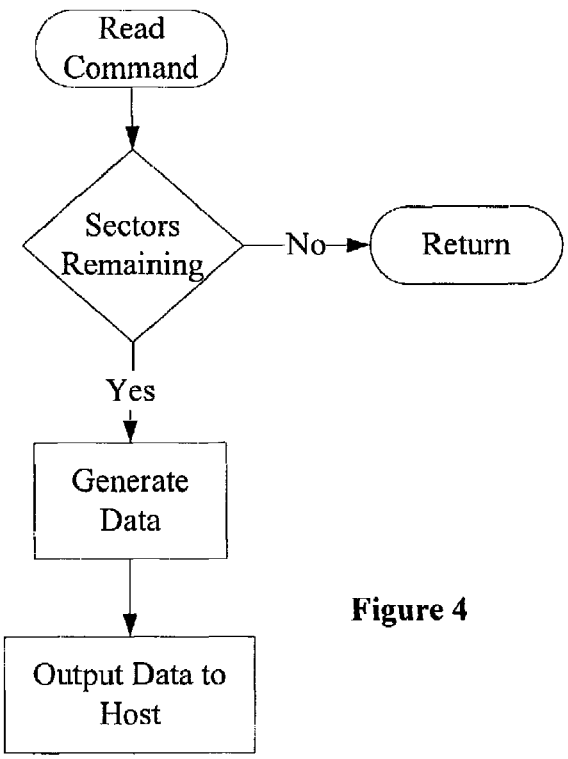
FIG. 4 is a block diagram of the algorithm used to generate sequential test date for output to the host computer used in FIGS. 1a and 1b.

FIG. 4 is a block diagram of the algorithm used to generate sequential test date for output to the host computer 10. This module processes qualified section read (ATA) commands received from the host. This module generates the requested number of sectors of test data and transmits these to the host computer.

The method may optionally include a further step 32 to further ensure that the data was acquired successfully. After an error free acquisition, the agent may open and view the image to ensure that the data is visible and accessible. Potentially destructive ATA commands could be handled in a variety of way. For example, the command could be ignored with successful status, write protect status returned or any potentially destructive command received could set off a "write" led for checking write blockers.

Preferably, the method in accordance with the teachings of this invention is adapted for Intel-based computers running Windows with EnCaSe™ or FTK™, or other proprietary data acquisition tool. It should be noted that while WINTEL platforms and Encase™/FTK™ are popular systems in use for computer forensics, the device in accordance with the teachings of this invention can also be used with non-Intel computers having an IDE or SATA hard disk interface.

Advantages of use of the storage medium and method in accordance with the teachings of this invention includes the ability to perform an acquisition with confidence in the least amount of time possible, verification of data transfer pathway resulting in a scientifically sound procedure that can be easily defended in court.

In another embodiment, the invention also contemplates use of flowthru data MD5 hash computation. This uses a switch to toggle between test and operational modes and an LED readout of sector count and hash value. This could further provide a higher level of assurance.

Update ROM capability allows future updates to firmware/ data, resulting in field upgrade capability.

Further, to address potential overheating (and thus possible permanent damage) during long acquisition processes, the storage medium could also include a temperature control 40. In one embodiment, the temperature control would include a grounded temperature controlled tray to activate on demand forced air cooling of the hard disk being acquired. A thermally activated cooling for the device could also be used to prevent overheating when powered over extended periods. The device could shutdown on continued overtemp.

While the method in accordance with the teachings of this invention have been described with reference to IDE, SATA and SATA-2 formats, it should be understood that it can be applied to other hard disk storage media interface formats such as SCSI or Serial SCSI.

At successful completion of the test, the device would be physically removed and replaced by the actual subject hard disk to be acquired. In order to further mitigate any potential change to the data acquisition pathway, the device could include a cable terminator ejector.

In another embodiment, testing could incorporate two phases, a short test in PIO mode then a longer test for UDMA mode in various embodiments in accordance with the teachings of this invention.

Embodiments of the invention thus provides a compact rugged-ized (small) termination device for ribbon cable that would accommodate suitable physical connector formats, such as 2.5", 3.5", or SATA format physical connector. A device in accordance with the teachings of this invention emulates a hard disk such as an IDE or SATA hard disk (of a suitable size which could be specified by the user) with known content. The device is easily connected in place of the subject hard disk, and is visible by the host personal computer as a hard disk. The agent would then launch a forensic data acquisition application (such as Encase™ as known in the art) and acquire (or hash) a preset number of sectors of data. The agent then verifies (via visual means) this hash value to the pre-established (known) hash value of the device. Any difference would indicate failure meaning that there are data integrity issues with the current setup. Any suitable hash value can be used.

As mentioned above, the device simulates readonly functions of a hard disk, and is capable of performing I/O in PIO and UDMA data transfer modes. The user would be able to define and create custom load profiles ranging from 1 to 2^48 sectors. For future technology considerations, the sector size can also be selected, available size options being 256, 512, 1024, 2048, 4096, 8192, 16384, 32768 bytes.

Embodiments of the device in accordance with the teachings of the invention may also include a programmable interface to:

Simulate read errors in order to verify functionality of hard disk acquisition applications and disk duplication. The device could simulate I/O status (and data output) consistent with ANSI ATA specifications. Sector read error types (with and without data) should be selectable to ensure capability to test response by host imaging applications.

Simulate features such as Host Protected Area (HPA) to assist in verifying functionality of hard disk acquisition applications and disk duplication. The HPA would be assigned at creation time, and, the MD5/SHAx hash values up to the HPA and the entire load size would be maintained.

Be programmed to alert the user when the host equipment issues a command (received by the device) that would normally alter data.

In one embodiment, the device includes a set of switches/LED or other indicators or console which provides/sets the following information:
1) Status (Poweroff=dark, Yellow=ON (ready), POST pass=Green, Fail POST=Red).
2) Current MD-5 (or SHA1) Hash value.
3) For IDE hard disks, Master/Slave/Cable select settings Sector size (eg: 512-8192 byte/sector) Maximum number of sectors for emulated disk HPA start sector position and size in sectors Error type, start address (LBA or CHS), number of sectors.

In one embodiment, the device can serve as a write blocker tester by lighting up an LED when a non readonly ATA command is received. For example, writes, non volatile settings, etc.

In additional embodiments, the device may graphically display progress such as data transfer rates (sectors transferred, maximum load, elapsed time and remaining time) and/or incorporate a received command store where the sequence of ATA commands received from a host system can be buffered for later viewing (debugging).

In other embodiments, the invention could also be used in a research role in a laboratory, where hardware and software can be validate for use in hard disk acquisition evaluations. This embodiment could include disk read error simulation to verify the functions performance characteristics of h/w and s/w under error or exceptional circumstances. The device could simulate HPA and OFFSET functions that conceals a portion of the hard disk in order to evaluate equipment response to these conditions. For extended use in a laboratory environment for equipment validation, the device could retain an additional 24 load profiles to a total of 32 load profiles. Load profiles are user managed where the user would be able to delete and create custom load profile. The user would be able to create and delete load profiles.

Numerous modifications may be made without departing from the spirit and scope of the invention as defined in the appended claims.

What is claimed is:

1. A method of verifying the integrity of data acquisition to a host computer over a data acquisition pathway, the method comprising:
    connecting a storage medium containing known data to said data acquisition pathway, the storage medium being capable of emulating a hard disk;
    transferring the known data from said storage medium to the host computer over said data acquisition pathway for storage on the host computer; and
    comparing a characteristic of the data stored on the host computer with a corresponding characteristic of said known data to determine whether data corruption has occurred during data transfer over said data transfer pathway.

2. The method of claim 1, wherein the characteristic is a hash code value.

3. The method of claim 2, wherein the hash code value is a Message-Digest 5 (MD5) hash value.

4. The method of claim 2, wherein the hash code value is a Secure Hash Algorithm SHA1.

5. The method of claim 2, wherein the hash code value is a Secure Hash Algorithm SHA2.

6. The method of claim 1, wherein the step of transferring includes using a UDMA transfer mode.

7. The method of claim 1, wherein the step of transferring includes using PIO transfer mode.

8. The method of claim 1, wherein the storage medium emulates an IDE hard disk.

9. The method of claim 1, wherein the storage medium emulates a SATA hard disk.

10. The method of claim 1, wherein the storage medium is a read-only memory.

11. The method of claim 1, wherein the storage medium is a flash memory.

12. The method of claim 1, further comprising the step of controlling the temperature of the storage medium to prevent over-heating.

13. The method of claim 1, further comprising the step of setting operational characteristics of the storage medium.

14. The method of claim 1, wherein the storage medium simulates read errors.

15. A device for verifying the integrity of a data transfer pathway, the device comprising:
- a non-volatile static storage medium containing known fixed data unambiguously identified by a predetermined characteristic; and
- an interface emulating a hard disk interface for connecting to a data acquisition pathway connected to a host computer, wherein the known data can be transferred from said storage medium to the host computer over said data acquisition pathway for storage on the host computer, and the characteristic of the data stored on the host computer can be compared with a corresponding characteristic of said known data to determine whether data corruption has occurred during data transfer over said data acquisition pathway.

16. The device of claim 15, wherein the characteristic is a hash code value.

17. The device of claim 16, wherein the hash code value is a Message-Digest 5 (MD5) hash value.

18. The device of claim 16, wherein the hash code value is a Secure Hash Algorithm SHA1.

19. The device of claim 16, wherein the hash code value is a Secure Hash Algorithm SHA2.

20. The device of claim 15, wherein the storage medium emulates an IDE hard disk.

21. The device of claim 15, wherein the storage medium emulates a SATA hard disk.

22. The device of claim 15, wherein the storage medium is a read-only memory.

23. The device of claim 15, wherein the storage medium is a flash memory.

24. The device of claim 15, further comprising a temperature controller to prevent over-heating of the storage medium.

25. The device of claim 24, wherein the temperature controller is a grounded temperature controlled tray.

26. The device of claim 15, further including a cable terminal ejector.

27. The device of claim 15, wherein the interface is configured to simulate read errors.

\* \* \* \* \*